United States Patent
McAdoo et al.

(10) Patent No.: US 6,263,773 B1
(45) Date of Patent: Jul. 24, 2001

(54) ENGINEERED WOOD PRODUCTS CUTTING METHOD AND APPARATUS

(76) Inventors: David L. McAdoo, 3636 Country Rd. 613, Alvarado, TX (US) 76009; George Blaine, P.O. Box 760, Lake Stevens, WA (US) 98258

( * ) Notice: Subject to any disclaimer, the term of this patent is extended or adjusted under 35 U.S.C. 154(b) by 0 days.

(21) Appl. No.: 09/398,837

(22) Filed: Sep. 16, 1999

(51) Int. Cl.⁷ ............................ B26D 5/00; B23Q 15/00
(52) U.S. Cl. ................ 83/75.5; 52/309.16; 52/730.7; 83/13; 83/369; 83/370; 83/74; 144/357; 144/379; 700/171
(58) Field of Search ................... 83/13, 34, 74, 83/75.5, 369, 370; 52/309.3, 309.16, 730.1, 730.7, 745.19; 144/356, 357, 379; 700/142, 171, 190, 193

(56) References Cited

U.S. PATENT DOCUMENTS

| | | | |
|---|---|---|---|
| 3,687,178 | * 8/1972 | Golick et al. | 83/369 |
| 3,720,247 | * 3/1973 | Lindblom | 83/369 |
| 3,910,142 | * 10/1975 | Jureit et al. | 83/74 |
| 4,727,787 | * 3/1988 | Schlosser | 83/369 |
| 5,072,640 | * 12/1991 | Greve et al. | 83/369 |
| 5,156,077 | * 10/1992 | Stursberg | 83/369 |
| 5,293,796 | * 3/1994 | Zober | 83/369 |
| 5,444,635 |   8/1995 | Blaine et al. | 700/171 |
| 6,050,047 | * 4/2000 | Covelli et al. | 52/730.7 |

OTHER PUBLICATIONS

Dimter OptiCut Series 300 advertisement "The more expensive your timber becomes, the more you need a Dimter."—published Jul. 1996.

Reinhardt Econony 3000 advertisement—published Mar. 1992.

Evans Machinery, Inc. Monostop advertisement—published Jan. 1994.

TecTool advertisement "Cut your material losses with kwikstop"—known to be published at least as early as Sep. 1, 1999.

Precision Automation, Inc. TigerStop™ The Automated Cutoff Stop & Programmable Pusher advertisement "Let a Tiger cut your work down to size!"—known to be published at least as early as Sep. 1, 1999.

Botten Troncatrici Elettroniche advertisement—known to be published at least as early as Sep. 1, 1999.

Cursal High Technology on Wood advertisement—known to be published at least as early as Sep. 1, 1999.

(List continued on next page.)

Primary Examiner—W Donald Bray (57) ABSTRACT

The invention is a method and apparatus for processing an Engine Wood Product member. The member is moved to a home position in a driving unit and the length of the EWP member is automatically measured by moving the EWP member from the home position while engaging the EWP member with a measuring assembly including a measuring wheel having a smooth hard facing, the facing contacting the EWP member. The member is moved to a first cutting position and cut to a predetermined length. Activating one or more position sensor devices, at least one of the position sensor devices positioned such that the EWP member engages the position sensor device while the member is in the home position, the length of the member is determined as it is moved from the home position. Moving the EWP member is accomplished by clamping the EWP member between at least one driver roller and at least one pressure roller, each driver roller aligned with a corresponding pressure roller, and rotating the at least one driver roller to move the EWP member. First and second driver rollers may be spaced apart and positioned on opposite sides of the measuring wheel. An outfeed table and infeed table with angled rollers may further be employed.

29 Claims, 8 Drawing Sheets

OTHER PUBLICATIONS

RDI the SpeedFeeder™ "Automatic Positioning Systems for the Woodworking Industry" advertisement—known to be published at least as early as Sep. 1, 1999.

Ultimizers, Inc. Optimizing Cut–off Saws "Cut–off Saws are our only Business . . . " advertisement—known to be published at least as early as Sep. 1, 1999.

Precision Products Co. Heavy Chop Precision Products advertisement—known to be published at least as early as Sep. 1, 1999.

Grecon Limited Pack Saw 502 advertisement—known to be published at least as early as Sep. 1, 1999.

Ultimizers Inc. Series III UltimizeR advertisement—known to be published at least as early as Sep. 1, 1999.

GreCon "Optimizatiohn plus much more" advertisement—known to be published at least as early as Sep. 1, 1999.

Omega time advertisement—known to be published at least as early as Sep. 1, 1999.

* cited by examiner

ENGINEERED WOOD PRODUCTS CUTTING METHOD AND APPARATUS

TECHNICAL FIELD

The present invention relates to a method and apparatus for the automatic measuring and cutting of engineered wood products.

BACKGROUND OF INVENTION

The construction industry has seen an increase in the use of engineered wood products (EWP) in building projects. EWP members differ from conventional wood products in that EWP members are fiber-glue composites. I-beam type EWP members typically have flange members of solid cut wood and web members of composite wood. EWP members also include rectangular beams formed of lumber strips or veneers glued together. These products are known as glue laminated beams, laminated veneer lumber (LVL), or Microlam® Parallam®, laminated strand lumber (LSL), and by other names. EWP members are differentiated in the art from panel type products such as plywood, oriented strand board (OSB), particle board and the like. The EWP can be manufactured to any length, offering an advantage over normal wood members which are limited in length by the size of available raw wood. The solid wood flanges are typically woven together with glue at periodic finger joints. For convenience in shipping, the EWP members are usually manufactured at lengths of 40, 48 and 60 feet.

Unfortunately, the added length of the EWP members is inconvenient to handle when cutting to size for a production site. The added length makes accurate length measurement by a conventional measuring wheel assembly difficult and slows production when using a push-foot type feeder system. The EWP member typically is cut into several lengths, or cut members, for use at a site. The length of the cut members often must be accurate to within one-quarter inch of the desired length. While small inaccuracies in length measurement may not cause a significant variance when measuring a shorter conventional wood member, the cumulative effect of such measurement inaccuracies over the length of the longer EWP members may result in unacceptable length variances.

One type of error in measuring the length of an EWP member can be caused from measuring an EWP which is bent, bowed or otherwise misshapen. Inaccuracies in measurement by a wheel measurement assembly may be caused by imperfections in the wood and by the type of measuring wheel employed. The flange members of the I-beam type EWP will naturally include imperfections such as hard and soft spots, knots, voids, bends and the like. A typical wheel measurement assembly employs a measuring wheel having a knurled, serrated or spiked surface. The knurls assist the wheel in maintaining a constant friction with the wood surface. Unfortunately, the knurls will tend to bite into the wood in the soft spots and simply ride along the surface in the hard spots and at knots, causing the measuring wheel to travel vertically with respect to the wood surface. Similar motion of the wheel is caused where a void or bend in the wood member causes the entire wheel to "sink" towards the member as it rolls on the surface of the wood. This vertical motion results in inaccurate measurements. The distance the wheel has turned is the horizontal length of the wood member being measured plus the vertical distance traveled by the wheel dug measurement. The imperfections in the wood may cause only slight movement of the wheel in the vertical direction, fractions of an inch, but the sum of the vertical movement over the length of a sixty foot EWP may be significant.

This problem may be exacerbated by the characteristics of the measuring wheel itself Where the knurls or spikes are long, the wheel may sink and rise the length of the spikes creating measuring inaccuracies. This may be the case where the serrations are as small as 0.002 inches. Further, the size of the measuring wheel may cause problems. If the wheel is small, the wheel will tend to ride up and down on a great many of the imperfections in the wood thereby increasing the error in the length measurement.

Another problem presented by the great length of typical EWP members is slowed production speeds. When measuring and cutting conventional wood products, often a push-feed mechanism is employed wherein a pusher foot, powered through a belt or pulley to slide along the length of the infeed table, engages the EWP and pushes the member into the measuring and cutting stations. The rear feed system provides for accurate measurement since the positioning of the pusher foot itself can be accurately measured, but after feeding a member through the measuring station, the pusher foot is "reset", or returned, to its original position away from the measuring and cutting units. For the longer EWP members, the pusher foot would need to travel 40 to 60 feet to its original position slowing production speeds.

SUMMARY OF INVENTION

The method of the invention comprises processing an Engineered Wood Product member by feeding the member into an EWP processing apparatus, moving the member to a home position, and automatically measuring the length of the EWP member by moving the EWP member from the home position while engaging the EWP member with a measuring assembly including a measuring wheel having a smooth hard facing, the facing contacting the EWP member. The member is moved to a first cutting position and cut to a predetermined length Automatically measuring the length of the member may further comprise the steps of activating one or more position sensor devices, at least one of said position sensor devices positioned such that the EWP member engages the position sensor device while the member is in the home position. The EWP member is moved from the home position until the position sensor device is disengaged by the EWP member. Moving the EWP member is accomplished in one aspect of the invention by clamping the EWP member between at least one driver roller and at least one pressure roller, each driver roller aligned with a corresponding pressure roller, and rotating the at least one driver roller to move the EWP member. Preferably first and second driver roller correspond to aligned first and second pressure rollers. The first and second driver rollers may be spaced apart and positioned on opposite sides of the measuring wheel. The measuring assembly further comprises an encoder positioned adjacent the measuring wheel for tracking rotation of the measuring wheel. Moving the EWP member to a home position comprises the step of moving the EWP member from a first position wherein a front end of the EWP member does not engage a home position sensor to a second position wherein the front end of the EWP member engages the home position sensor. The method may include moving the EWP member to an outfeed table and placing the EWP member onto an infeed table.

The apparatus of the invention comprises a driving unit having a driver assembly for moving an EWP member, a length determining assembly for sensing the location of an EWP member, and a measuring assembly for measuring the distance of movement of an EWP member, and a cutting unit for cutting an EWP member into preselected lengths. The measuring assembly includes a measuring wheel having a hard smooth facing for contact with the EWP member. The length determining assembly includes one or more position sensor devices, at least one of the position sensor devices positioned adjacent an EWP member where the EWP member is in a home position. The driver assembly has at least one driver roller, the driving unit having a pressure assembly having at least one pressure roller, each driver roller aligned with a corresponding pressure roller. First and second driver rollers may be spaced apart and positioned on opposing sides of the measuring wheel. The measuring assembly further includes an encoder positioned adjacent the measuring wheel for tracking rotation of the measuring wheel. The measuring assembly may also have a pivoting arm supporting the measuring wheel and a measuring wheel pressure cylinder operably connected to said pivoting arm to maintain pressure between the measuring wheel and an EWP member adjacent the measuring wheel. The Engineered Wood Product processing apparatus may further comprise an infeed table and an outfeed table, the tables having a plurality of table rollers positioned at an angle with respect to a floor surface.

BRIEF DESCRIPTION OF THE DRAWINGS

Drawings of a preferred embodiment of the invention are annexed hereto, so that the invention may be better and more fully understood, in which.

Numeral references are employed to designate like parts throughout the various figures of the drawing. Terms such as "left," "right," "clockwise," "counter-clockwise," "horizontal," "vertical," "up" and "down," "forward" and "backward" when used in reference to the drawings, generally refer to orientation of the parts in the illustrated embodiment and not necessarily during use. The terms used herein are meant only to refer to relative positions and/or orientations, for convenience, and are not to be understood to be in any manner otherwise limiting. Further, dimensions specified herein are intended to provide examples and should not be considered limiting.

DESCRIPTION OF A PREFERRED EMBODIMENT

Figure 1:
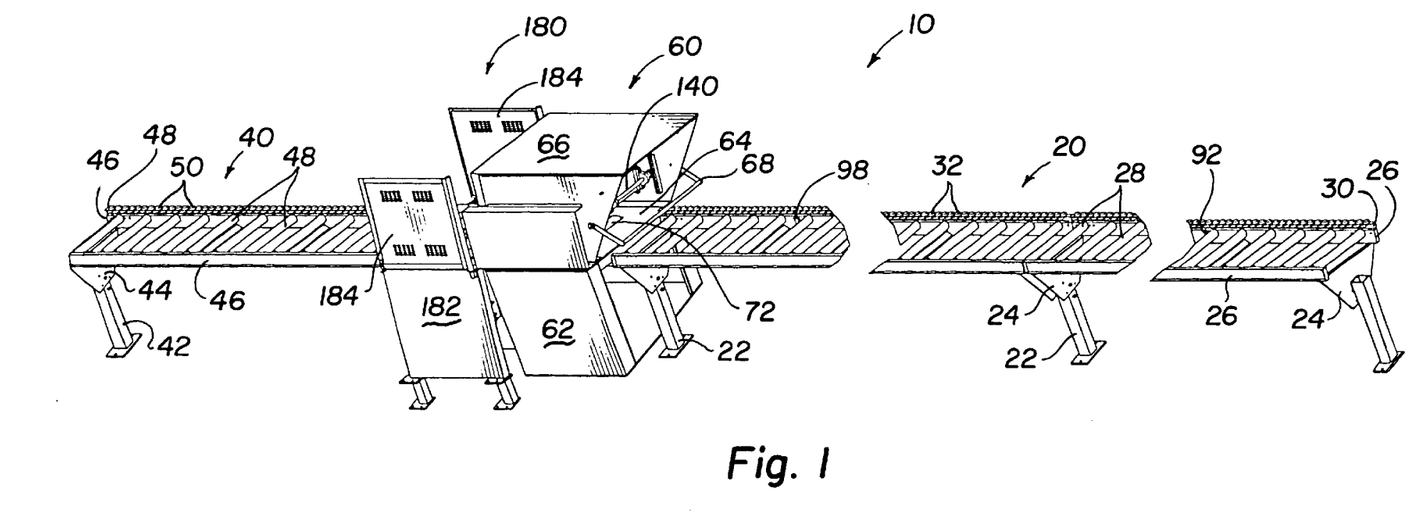
FIG. 1 is an isometric view of the EWP measuring and cutting apparatus according to the invention.
Figure 2:
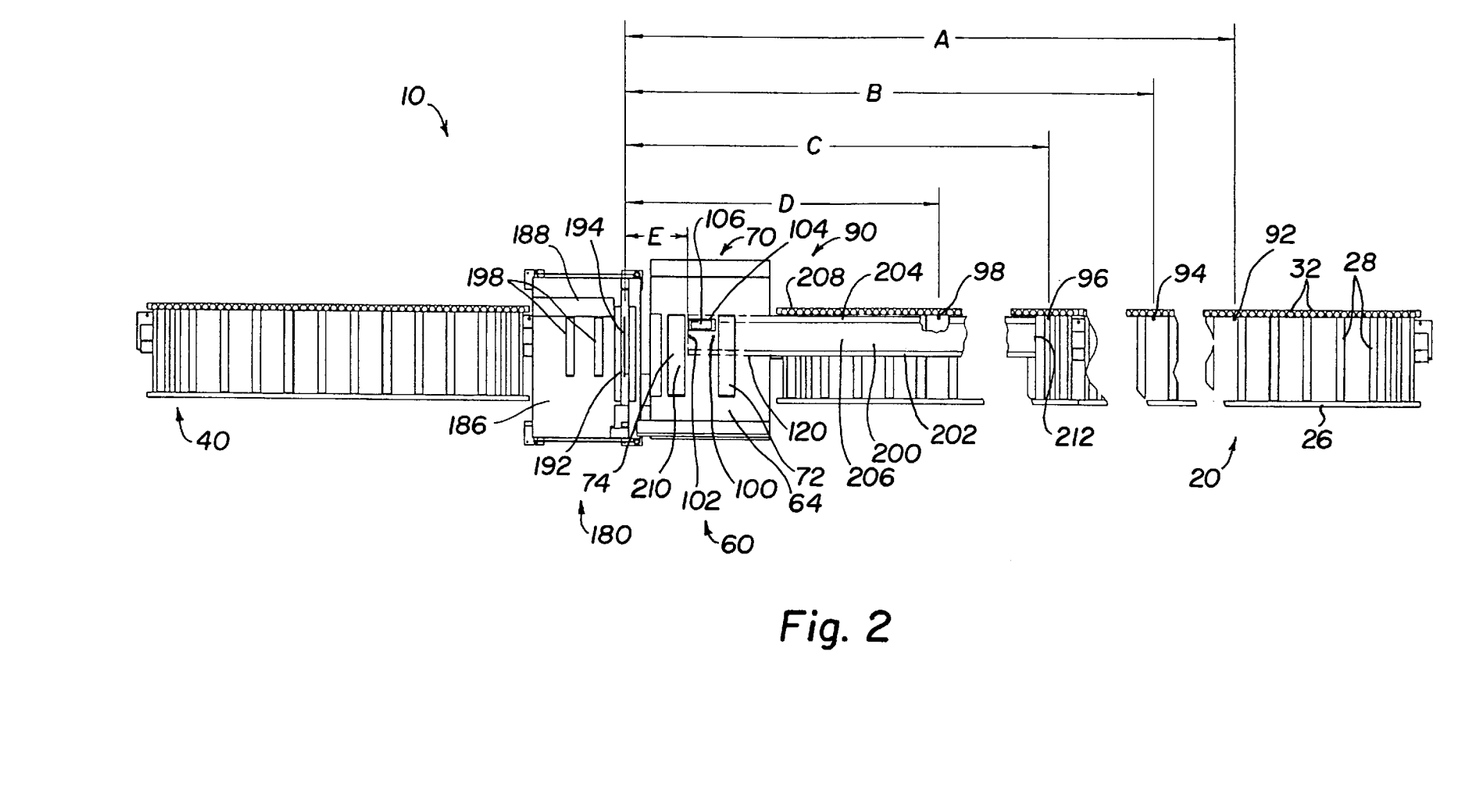
FIG. 2 is a partial top view of the EWP measuring and cutting apparatus according to the invention.
Figure 8:
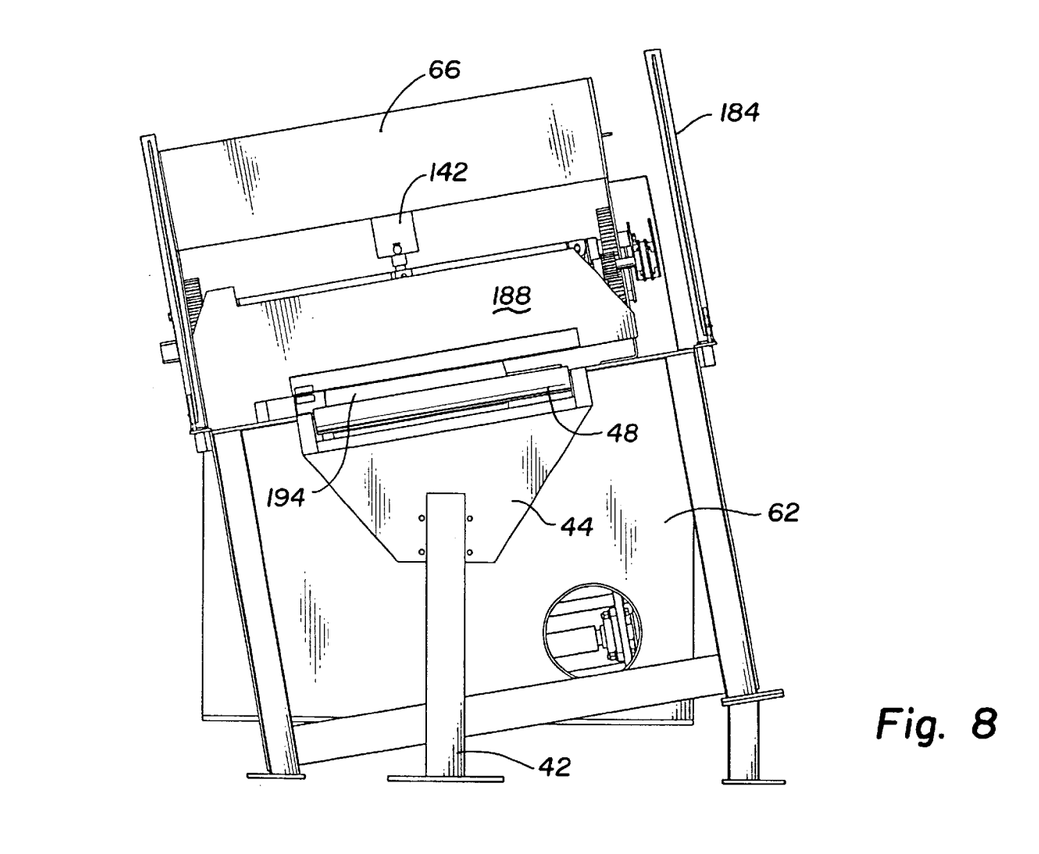
FIG. 8 is a left elevational view of the outfeed table, cutting unit and driver unit according to the invention.

The invention is herein described with reference to the accompanying drawings and is not intended to limit the scope of the claimed invention, but is intended to describe particular embodiments to disclose the best mode of the invention to those skilled in the art FIGS. 1 and 2 show an engineered wood product (EWP) processing apparatus 10 having an infeed table 20, an outfeed table 40, a driving unit 60 and a cutting unit 180. The infeed and outfeed tables have legs 22 and 42, support brackets 24 and 44, and side rails 26 and 46 supporting a plurality of feed rollers 28 and 48, all respectively. The support brackets are preferably designed such that the feed rollers are supported at an angle with respect to the floor surface (as best seen in FIG. 8). The infeed table 20 has a lower side rail 26 which preferably supports a stop rail 30 having a plurality of stop rail rollers 32. Similarly, the outfeed table 40 preferably comprises a stop rail 50 with a plurality of stop rail rollers 52. The angle of the feed rollers is selected such that an engineered wood product 200, when placed on the rollers, will slide downward into contact with the stop rail and stop rail rollers. The engineered wood product 200 is then positioned for proper feeding into the driving unit 60 and cutting unit 180. It is not necessary to employ a feed roller angle, however, the angle eliminates the need for a movable jig assembly or other mechanism for positioning and handling the engine wood product against the stop rail for measuring and cutting.

Referring to FIG. 1, driving unit 60 has a driving unit base 62 supporting a driving unit surface 64 and a driving unit hood 66. The driving unit comprises a driver assembly 70, a length determining assembly 90, a measuring assembly 130 and a pressure assembly 140. The driving unit hood 66 acts as a safety guard during operation of the processing apparatus 10 and as support for the pressure assembly 140. The hood 66 also supports safety bar 68 which guards against user contact with the driving unit while in use.

Figure 3:
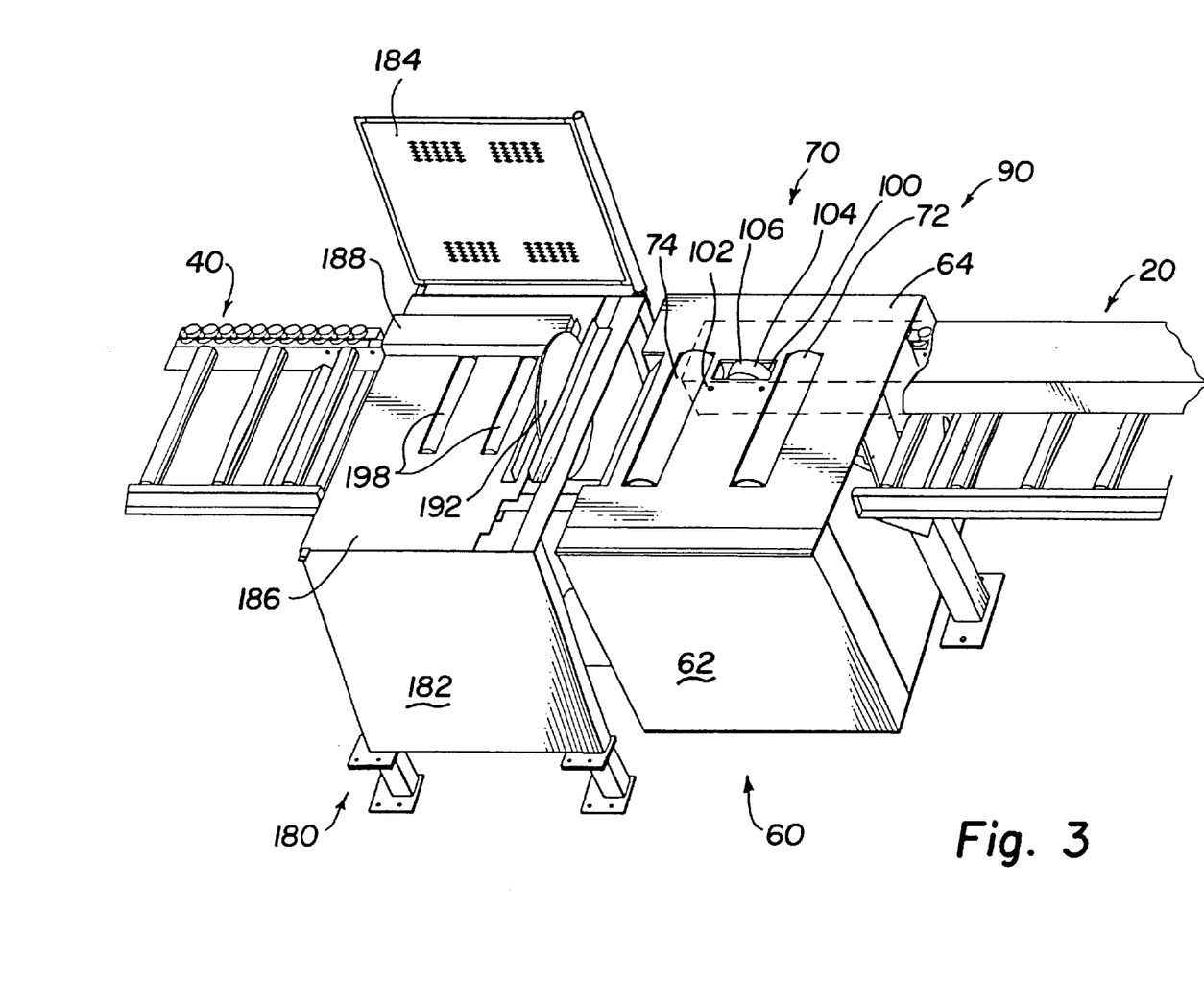
FIG. 3 is a partial isometric view of the driver unit and cutting unit of the invention.
Figure 4:
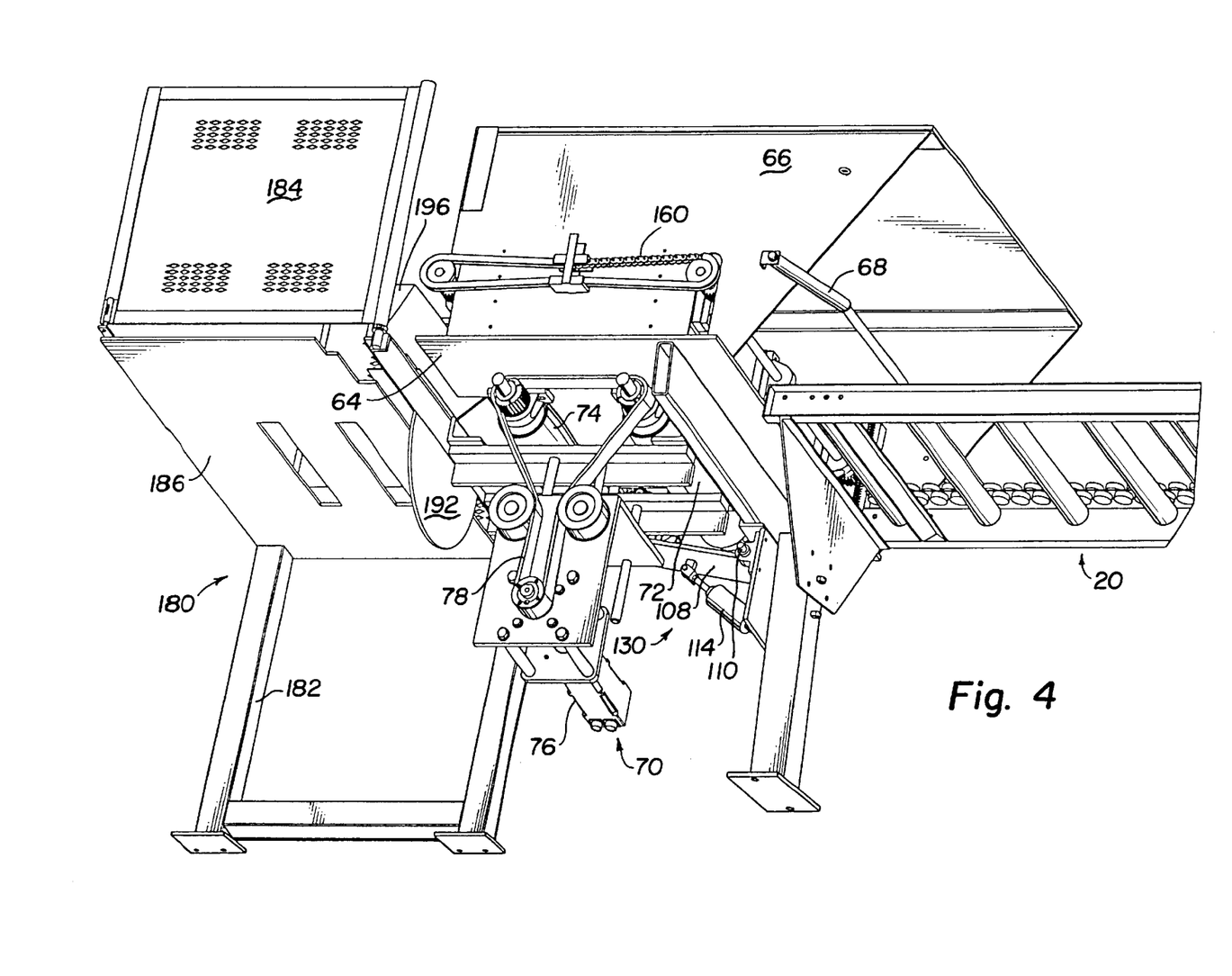
FIG. 4 is a partial isometric bottom view of the driver unit and cutting unit according to the invention.

The driving unit base 62 supports a driver assembly 70. A first driver 72 and a second driver 74 are spaced in parallel and extend through the driving surface 64, as seen in FIGS. 2 and 3. The drivers 72 and 74 are preferably serrated to better grip and move the engineered wood product 200. It is not necessary to employ two drivers, but it is preferred for better handling of the engineered wood product The drivers 72 and 74 are powered by a drive motor 76, mounted to the driving unit surface plate 64 or the driving unit base 62, through a drive belt or chain 78, as best seen in FIG. 4. Other power arrangements may be employed such as known in the art The driving unit 60 further comprises a length determining assembly 90, seen in FIGS. 1 and 2. The length determining assembly 90 includes a plurality of position sensors, namely a first, second, third and fourth position sensor 92, 94, 96 and 98, respectively, and a first and second home position sensor, 100 and 102, respectively. These position sensors are spaced along the path of travel of the engineered wood product and are used to gage the length of the product for cutting. The number and placement of the sensors is not critical, however, it is preferred that the sensors be located as described herein. The first position sensor 92 is mounted on the infeed table 20 at a selected distance A, preferably 59 feet, from the path of the saw blade 214 of the cutting unit 180. The second sensor 94 is similarly mounted a distance B, 47 feet, from the path of the saw blade 214. The third sensor 96 is spaced a distance C, preferably 23 feet, from the path of the saw blade 214. The fourth sensor is spaced a distance D, preferably eight feet, from the path of the saw blade 214. These preferred distances are selected based on the typical production lengths of engineered wood products, 40, 48 and 60 feet. The position sensors may be photocells or other types of position sensors as known in the art The first and second home position sensors 100 and 102, respectively, are mounted to the driving unit surface plate 64, spaced from one another on either side of a measuring wheel 104. The distance between the second home position sensor 102 and the saw blade path 213 is the offset distance E, and can be any known distance. In the preferred embodiment the offset distance is approximately two feet.

Figure 5:
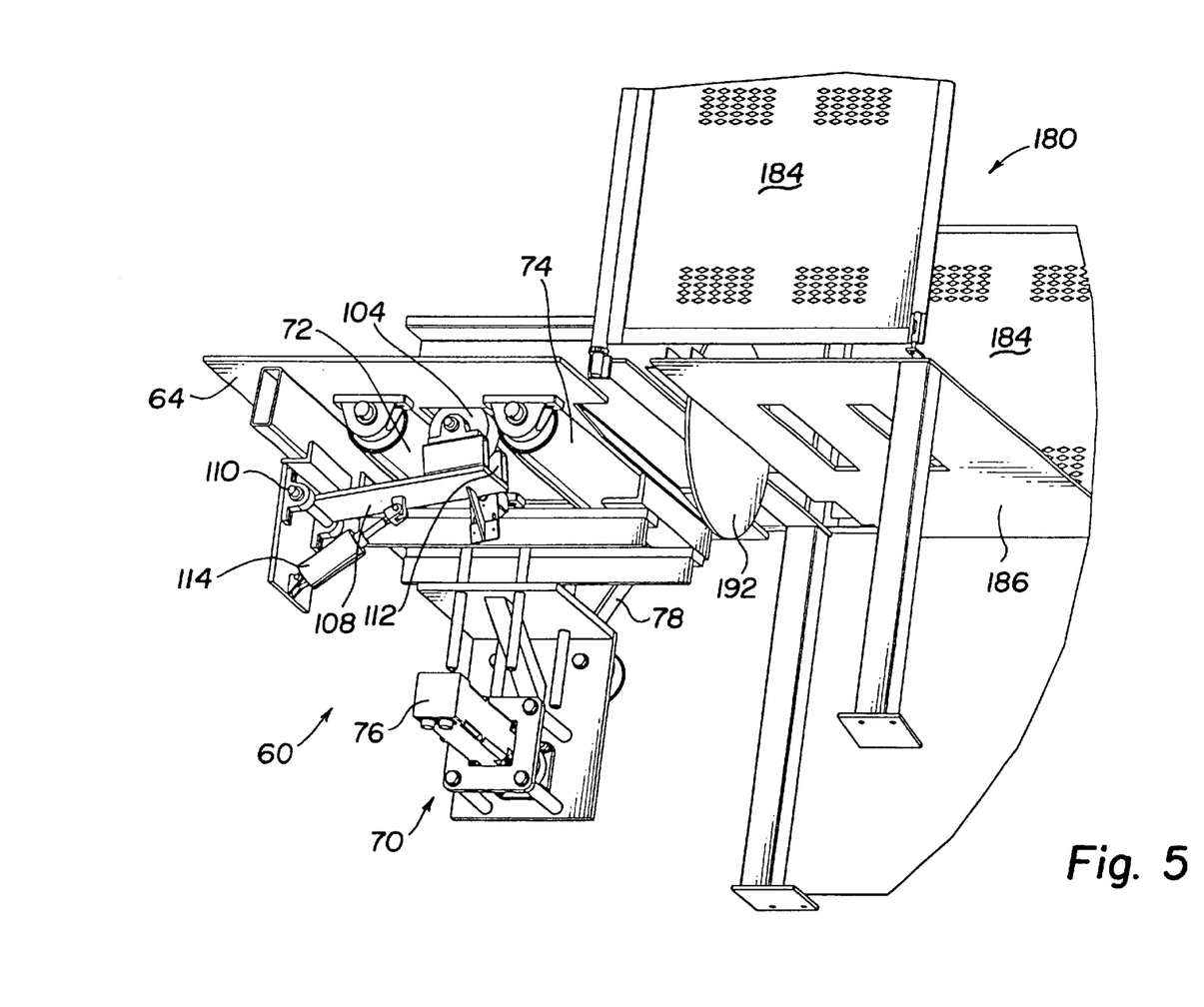
FIG. 5 is a partial isometric rear view of the driver unit and cutting unit according to the invention.

Measuring assembly 130 is best seen in FIGS. 2 and 5. The measuring wheel 104 is mounted between the drive rollers 72 and 74 in the preferred embodiment (as best seen in FIGS. 2 and 3). The measuring wheel 104 is made of a hard substance, preferably steel, and has a smooth facing 106 for contacting the engineered wood product surface. The measuring wheel should not be serrated, spiked or covered with flexible materials, but should rather be hard and smooth. The measuring wheel is mounted to a wheel arm 108 which is hinged at pivot 110 to allow movement of the measuring wheel 104 up and down in relation to the driving unit surface plate 64, as best seen in FIG. 5. Pressure is maintained on the wheel arm 108 by measuring wheel cylinder 114, or other suitable wheel pressure device, to insure that the measuring wheel maintains a constant contact pressure with the engineered wood product. The pressure is selected to maintain a level of constant friction between the wheel 104 and the product which will prevent slipping between the wheel and the engineered wood product.

Figure 6:
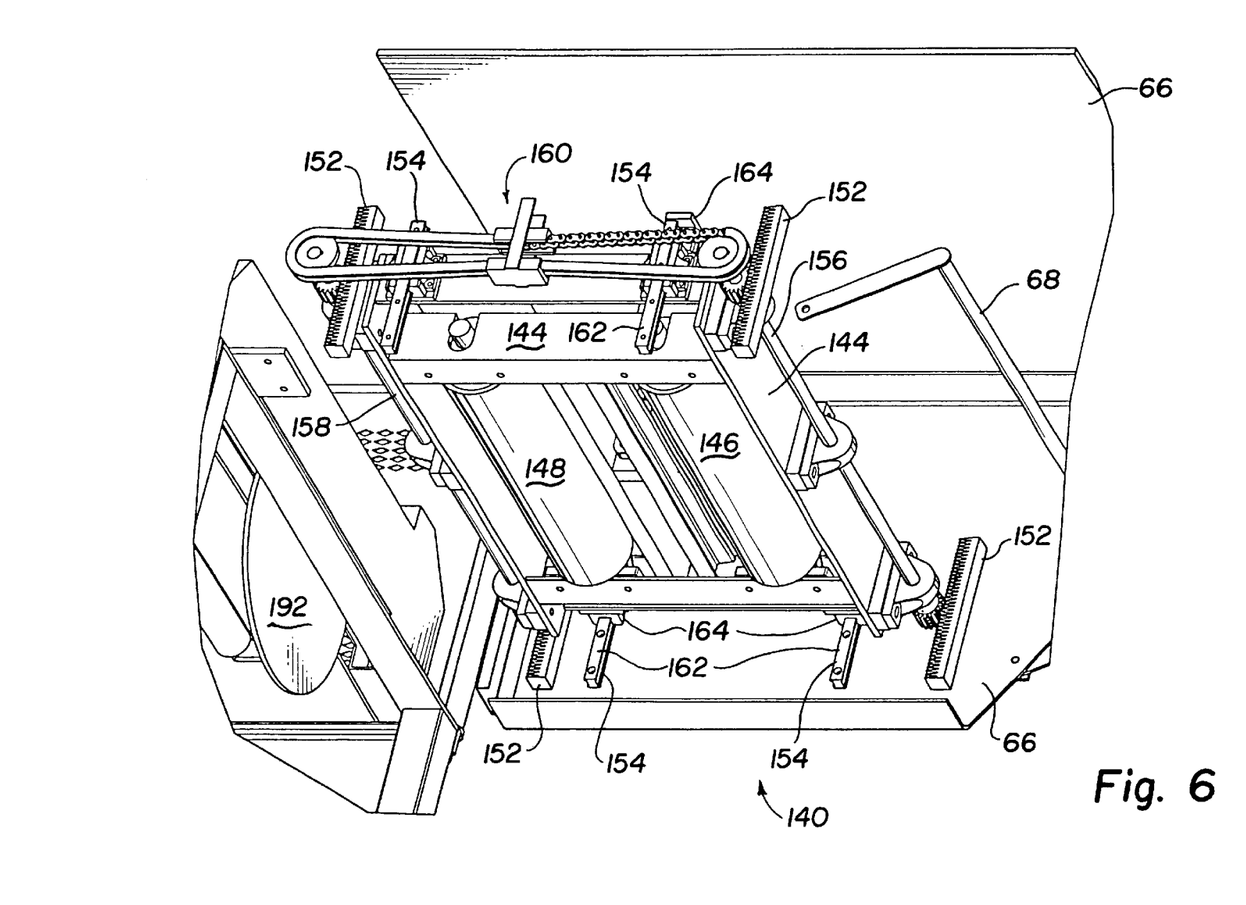
FIG. 6 is a partial isometric bottom view of the driver unit with pressure assembly according to the invention.
Figure 7:
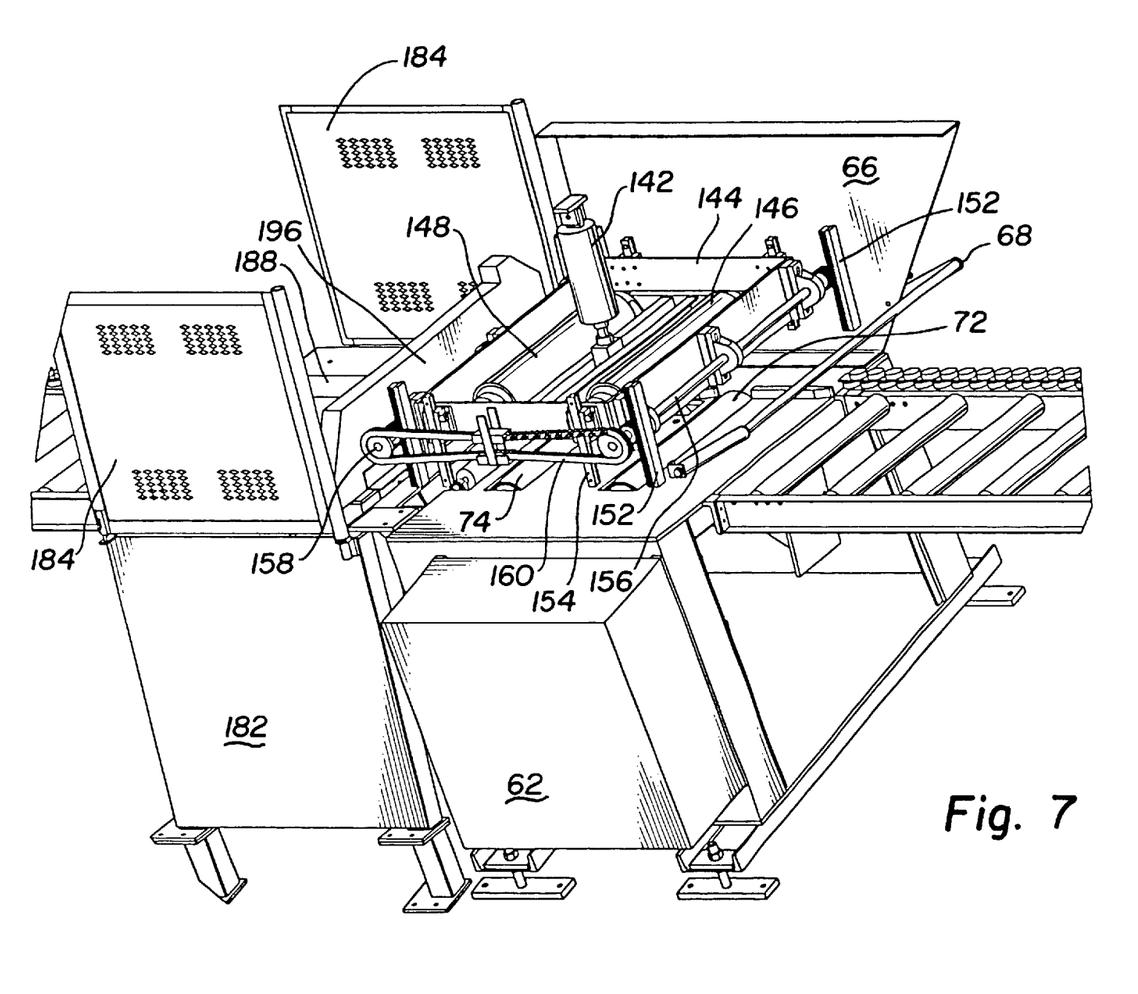
FIG. 7 is a partial isometric view of the pressure assembly according to the invention.

A measuring wheel encoder 112 is mounted proximate measuring wheel 104 to track the rotation of the measuring wheel as is known in the art. The encoder 112 accurately tracks the rotation of the measuring wheel, which has a known diameter, so that calculation of the distance the wheel perimeter has rotated is possible. This enables accurate measurement of the length of engineered wood product which has been fed through the driving unit. The output of the encoder is transmitted to a computer (not shown) or similar instrument for such calculation as is known in the art The driving unit 60 further includes a pressure assembly 140, as best seen in FIGS. 6 and 7. The pressure assembly 140 selectively forces the engineered wood product 200 against the driver rollers 72 and 74 to insure adequate friction between the wood product and the driver rollers. The pressure assembly 140 is actuated by a pressure cylinder 142, preferably an air cylinder, which moves the pressure assembly up and down with respect to the driving unit surface plate 64. The pressure cylinder 142 is connected to the pressure assembly frame 144 which supports the first and second pressure rollers 146 and 148, respectively. The pressure rollers 146 and 148 are mounted in spaced parallel arrangement corresponding to the arrangement of the drive rollers 72 and 74. It is important that the pressure rollers 146 and 148 align with the driver rollers 72 and 74 so the clamping action of the rollers does not induce deformation of the engineered wood product 200. Such deformation will reduce the accuracy of the length determining assembly 90.

Referring to FIG. 6, to insure that the pressure assembly 140 remains parallel to the driving unit surface plate 64 and drive rollers 72 and 74 throughout its vertical motion, it is preferred that a stabilizing assembly 150 be employed The stabilizing assembly 150 includes four rack and pinion assemblies 152, four linear bearings 154, a live axle 156, a timing axle 158 and an axle linkage assembly 160. The racks of the rack and pinion assemblies 152 are mounted to the interior walls of the driving unit hood 66, as shown. The pinions ride upon the racks as the pressure assembly 140 is raised and lowered by the pressure cylinder 142. The pinions are connected operably to the pressure assembly frame 144 through a live axle 156 and a timing axle 158. The axles are connected by a linkage assembly 160 so that the axles move in unison The linear bearings 154 have linear slide rails 162 mounted to the hood 66 and linear bearing trucks 164 mounted to the pressure assembly frame 144. The linear bearings and rack and pinion system insure that the pressure assembly and the pressure rollers maintain the appropriate orientation throughout operation. Other pressure assemblies may be employed without departing from the spirit of the invention.

The cutting unit 180 is adjacent the driving unit 60 as seen in FIG. 1. The cutting unit 180 is supported from the floor surface by a cutting unit base 182 configured to support the cutting unit surface plate 186 at the same angle with respect to the floor as the feed rollers 28 and 48 and the driving unit surface plate 64, as best seen in FIG. 8. Cutting unit stop rail 188 is aligned with stop rails 30 and 50. The cutting unit 180 includes a saw blade 192 with appropriate guards 184 and 196 to insure safety. The saw blade 214 is mounted for movement along a blade path 194 which extends from below to above the cutting unit surface plate 186. Cutting unit rollers 198, which may be powered to drive the EWP forward onto the outfeed table 40, are preferably provided The cutting unit is preferably of the "pop-up" type shown here, but other arrangements as are known in the art may be used without departing from the spirit of the present invention.

The driving unit 60, including the length determining assembly 90, the driver assembly 70, the measuring assembly 130 and the pressure assembly 140, and the cutting unit 180 are operably connected to a computer through appropriate electronics as are known in the art The computer enables the user to input the desired lengths of engineered wood product needed for a particular job. The computer may optimize the cuts made in the wood product through an appropriate program. Further, the computer controls the cutting unit and the driving unit. The computer receives input signals from at least the position sensors and encoders in determining the length of the EWP. The computer is operably connected to activate and control the driver assembly and pressure assembly for positioning the EWP and the cutting unit for cutting the EWP. The computer receives input from the measuring assembly to determine the length of the engineered wood product and to determine the appropriate positioning of the engineered wood product in selecting the locations of the cuts to be made. The computer may optimize the cuts in the product by a method such as the one disclosed in U.S. Pat. No. 5,444,635 to Blaine, which is incorporated herein by reference.

In the method of cutting an engineered wood product to predetermined lengths, the EWP 200 is placed onto the infeed table 20 and fed into the driver unit 60. The length of the EWP 200 is measured by the measuring assembly 90, the EWP is moved into the cutting unit 180 to be cut. The cut is made and the cut member is driven onto the outfeed table 40.

In operation, an engineered wood product 200 is placed on the infeed table 20. FIG. 2 shows a typical I-beam type EWP 200, while FIG. 3 shows a typical rectangular beam type EWP 200. An I-beam type EWP 200 is typically comprised of an upper and lower flange 202 and 204, respectively, joined by a web member 206. EWP members differ from conventional wood products in that EWP members are fiber-glue composites. I-beam type EWP members typically have flange members of solid cut wood and web members of composite wood. EWP members also include rectangular beams formed of lumber strips or veneers glued together These products are, known as glue laminated beams, laminated veneer lumber (LVL), or Microlam®, Parallam®, laminated strand lumber (LSL), and by other names. EWP members are differentiated in the art from panel type products such as plywood, oriented strand board (OSB), particle board and the like. The EWP can be manufactured to any length, offering an advantage over normal wood members which are limited in length by the size of available raw wood. The solid wood flanges are typically woven together with glue at periodic finger joints. For convenience in shipping, the EWP members are usually manufactured at lengths of 40, 48 and 60 feet.

Unfortunately, the added length of the EWP members is inconvenient to handle when cutting to size for a production site. The added length makes accurate length measurement by a conventional measuring wheel assembly difficult and slows production when using a push-foot type feeder system. The EWP member typically is cut into several lengths, or cut members, for use at a site. The length of the cut members often must be accurate to within one-quarter inch of the desired length While small inaccuracies in length measurement may not cause a significant variance when measuring a shorter conventional wood member, the cumulative effect of such measurement inaccuracies over the length of the longer EWP members may result in unacceptable length variances.

The EWP 200 is placed onto the infeed table 20 where it slides downward on the angled feed rollers 28 such that the lower surface 208 of the lower flange 204 contacts the stop rail rollers 32 of the stop rail 30. The rollers enable the EWP 200 to be easily moved along the infeed table 20 toward the driving unit 60. The front end 210 of the EWP 200 is fed into the driving unit 60 with the rear end 212 entering last The front end 210 of the EWP 200 must be pushed forward at least until the front end passes over and engages the first driver roller 72. When the EWP is fed into the driving unit 60, the driver rollers 72 and 74, the pressure assembly 140 and the length determining assembly 90 are activated to begin the task of measuring the length of the EWP 200.

The pressure assembly 90, as best seen in FIG. 6, clamps down on the EWP 200. The pressure cylinder 142, preferably an air cylinder, is activated and extends to force the pressure assembly frame 144 downward. The pressure rollers 146 and 148 engage the EWP, clamping the EWP 200 between the pressure rollers 146 and 148 and the driver rollers 72 and 74.

The stabilizing assembly 150 insures that the pressure assembly 140 remains parallel to the driving unit surface plate 64 and drive rollers 72 and 74 throughout its vertical motion. The pinions ride upon the racks as the pressure assembly 140 is raised and lowered by the pressure cylinder 142. The pinions are connected operably to the pressure assembly frame 144 through a live axle 156 and a timing axle 158. The axles are connected by a linkage assembly 160 so tat the axles move in unison. The linear bearings 154 and rack and pinions 152 insure that the pressure assembly 140 and the pressure rollers 146 and 148 maintain the appropriate orientation throughout operation.

One of the problems experienced in attempts to automatically and accurately measure EWP members is caused by the length of the member. One type of error in measuring the length of an EWP member can be caused from measuring an EWP which is bent, bowed or otherwise misshapen by the driving unit or pressure assembly. The drivers 72 and 74 and pressure rollers 146 and 148 align with one another, respectively, when clamping the EWP 200. The stabilizing assembly 150 and the placement of the pressure rollers 146 and 148 in alignment with the driver rollers 72 and 74 help insure accurate measurement of the length of the EWP 200. If the pressure and driver rollers arc not aligned, the offset would cause the EWP to bow The measuring wheel 104 would then measure the length of the arc of the bent EWP rather than the length of the straight EWP yielding erroneous measurements.

Another problem presented by the great length of typical EWP members is slowed production speeds. When measuring and cutting conventional wood products, often a push-feed mechanism is employed wherein a pusher foot, powered through a belt or pulley to slide along the length of the infeed table, engages the rear end 212 of the EWP 200 and pushes the member into the measuring and cutting stations. The rear feed system provides for accurate measurement since the positioning of the pusher foot itself can be accurately measured. After feeding a member through the measuring station, the pusher foot is "reset,, or returned, to its original position away from the measuring and cutting units. For the longer EWP members, the pusher foot would need to travel 40 to 60 feet to its original position slowing production speeds. The present invention does not employ a push-feed assembly, but rather employs the driver unit described herein. This front feed system, so called since the driver rollers 72 and 74 "pull" the EWP member into the driver unit by clamping on the front end 210 of the EWP 200, does not require any reset after engaging a first EWP member thereby reducing production times.

Once the EWP 200 is clamped between the pressure assembly 140 and the driver assembly 70, the driver rollers 72 and 74 are activated to move the uncut EWP 200 to the "home" position 120 directly above home position sensor 102, as seen in FIG. 3. The EWP 200 is in the home position when the front end 210 of the EWP 200 engages the second home position sensor 102. When the EWP 200 is fed into the driver unit 60, the EWP 200 may be positioned such that the it engages both home position sensors 100 and 102. That is, the EWP may have rolled forward and activated both sensors. In such an instance, the driver rollers 72 and 74 are activated to roll the EWP 200 backward When the front end 210 of the EWP 200 clears the second home position sensor 102 the driver rollers 72 and 74 reverse direction and move the EWP forward until the front end 210 of the EWP engages sensor 102 under more controlled circumstances, thereby positioning the EWP 200 in the home position 102. If, on the other hand, the EWP 200 is loaded into the driving unit 60 such that the front end 210 engages only the first home position sensor 100 or neither home position sensor is engages, then the EWP 200 is simply driven forward by the driver rollers 72 and 74 until the front end 210 engages the second home position sensor 102.

Once the EWP 200 is in the home position 120, the measuring wheel 104 and encoder 112 are activated to measure the uncut length of the EWP 200. The driver rollers 72 and 74 drive the EWP 200 forward while the measuring wheel 104 measures the distance the EWP 200 is traveling. As the EWP is driven forward, the measuring wheel 104 maintains a constant contact pressure against the EWP surface due to the pressure exerted on the measuring wheel support arm 108 by the measuring wheel pressure cylinder 114, preferably an air cylinder. In the preferred embodiment, the measuring wheel 104 engages the I-beam type EWP 200 at the lower flange 204 as seen in FIG. 2. This enables the measuring assembly to be used with I-beam type EWP members of various sizes without repositioning the measuring wheel. However, the wheel may be positioned in any suitable location which insures constant contact with the EWP. As the measuring wheel 104 rotates, the encoder 112 tracks the rotations of the wheel 104. The measuring wheel includes spaced apart photo- operative marks at known locations on the wheel. As the wheel rotates, the photocell of the encoder "reads" the marks as they cross the path of the photocell sending a series of on/off pulses which may be transmitted to a computer for counting. The computer uses a known Scale Factor to convert the rotations of the wheel into the distance the wheel perimeter has rolled using algorithms based on the known diameter of the wheel. The Scale Factor is a number equaling the number of pulses required for a selected point on the perimeter of the wheel to have rotated a selected distance, for example, one foot. Any type of encoder may be employed, but a photocell encoder, such as is known in the art, is preferred.

The accuracy of the wheel measurement assembly is critical. Inaccuracies in measurement by a wheel measurement assembly may be caused by imperfections in the wood and by the type of measuring wheel employed. The flange members of the I-beam type EWP will naturally include imperfections such as hard and soft spots, knots, voids, bends and the like. A typical wheel measurement assembly employs a measuring wheel having a knurled, serrated or spiked surface or a friction surface such as rubber. The knurls assist the wheel in maintaining a constant friction with the wood surface for accurate measurement. Unfortunately, the knurls will tend to bite into the wood in the soft spots and simply ride along the surface in the hard spots and at knots, causing the measuring wheel to travel vertically with respect to the wood surface. Similar motion of the wheel is caused where a void or bend in the wood member causes the entire wheel to "sink" towards the member as it rolls on the surface of the wood. This vertical motion results in inaccurate measurements. The distance the wheel has turned is the horizontal length of the wood member being measured plus the vertical distance traveled by the wheel during measurement. The imperfections in the wood may cause only slight movement of the wheel in the vertical direction, fractions of an inch, but the sum of the vertical movement over the length of a sixty foot EWP may be noticeable.

This problem may be exacerbated by the characteristics of the measuring wheel itself. Where the knurls or spikes are long, the wheel may sink and rise the length of the spikes creating measuring inaccuracies. This may be the case where the serrations are as small as 0.002 inches. Where the wheel is covered with rubber or a similarly resilient surface, the varied deformation of the rubber as the wheel rolls over surface imperfections will cause inaccuracies in measurement. Further, the size of the measuring wheel may cause problems. If the wheel is small, 1-3 inches in diameter, the wheel will tend to ride up and down on a great many of the imperfections in the wood thereby increasing the error in the length measurement. The measuring wheel 104 of the present invention is of larger diameter, preferably 6 inches, and the wheel facing 106 is smooth and hard, not knurled, to reduce errors in measurements as described above. The wheel is preferably made of steel or other metal.

The position sensors 92, 94, 96 and 98 are also activated when the EWP 200 is in the home position 120. Each of the sensors 92, 94, 96 and 98 indicates whether the EWP 200 is covering or engaging the sensor. For example, in FIG. 2, the EWP 200 is covering the fourth position sensor 98. The sensor indications are transmitted to a computer which tracks the sensors as they are triggered To determine the uncut length of the EWP 200, the EWP is driven forward by the driver rollers 72 and 74 while the measuring wheel 104 gages the distance the EWP travels. The EWP 200 is driven forward until the first covered sensor, in this case sensor 98, is uncovered, cleared or disengaged. When the sensor is cleared, a signal is sent to the computer. Since the distance D between the saw blade path 194 and the sensor 98 is known, the offset distance E is known, and the distance the EWP has rolled forward from the home position 120 is known (as measured by the measuring wheel 104), the length of the uncut EWP can easily be calculated, preferably by the computer.

The EWP 200 is now cut to predetermined lengths. The driver rollers 72 and 74 are engaged to drive the EWP 200 to a first cut position where the cutting unit 180 engages. The activated saw blade 192 travels along the blade path 194 through the EWP 200 thereby cutting the EWP. The cutting unit is preferably of the type wherein the saw blade is raised from below the cutting unit surface 186 to contact the EWP, however, other types of cutting unit may be used.

In practice, the EWP cutting processing apparatus 10 is used in conjunction with a computer which controls the operation of the apparatus assemblies. A computer program is employed to control apparatus timing and activation. The program will typically allow input by the user of several desired lengths of EWP to be cut from the uncut EWP member. The computer determines the most efficient way to use the EWP member and activates the machinery to position the EWP for cutting. After the first cut is finished, the cut member is driven forward onto the outfeed table 40 by the cutting unit rollers 198. A plurality of cuts may be made on a single EWP member 200. Typically, the first cut is designed to cut off the waste portion of the EWP member which will not be used in production. Further, the last section of EWP to be fed through the measuring assembly must be at least the length of the offset distance E so that the driver rollers 72 and 74 may continuously engage the last section during the cutting operation. To this end, the offset distance E is preferably shorter than the shortest desired section of the EWP. In the preferred embodiment, the offset distance E is approximately two feet. The cut sections of the EWP are fed onto the outfeed table 40 for further handling as desired.

While the preferred embodiment of the invention has been disclosed with reference to particular EWP measuring and cutting enhancements, and methods of operation thereof, it is to be understood that many changes in detail may be made as a matter of engineering choice without departing from the spirit and scope of the invention as defined by the appended claims.

Having described the invention, we claim:

1. A method of processing an Engineered Wood Product member to a predetermined length comprising the steps of:

feeding the EWP member into an EWP processing apparatus;

moving the EWP member to a home position;

automatically measuring the length of the EWP member by moving the EWP member from the home position while engaging the EWP member with a measuring assembly including a measuring wheel having a smooth hard facing, the facing contacting the EWP member;

moving the EWP member to a first cutting position; and cutting the EWP member to a predetermined length.

2. A method of processing an Engineered Wood Product member to a predetermined length as in claim 1 wherein the step of automatically measuring the length of the EWP further comprises the steps of:

activating one or more position sensor devices, at least one of said position sensor devices positioned such that the EWP member engages the at least one position sensor device while in the home position, and moving the EWP member from the home position until the at least one said position sensor device is disengaged by the EWP member.

3. A method of processing an Engineered Wood Product member to a predetermined length as in claim 1 wherein moving the EWP member further comprises the steps of:

clamping the EWP member between at least one driver roller and at least one pressure roller, each driver roller aligned with a corresponding pressure roller, and rotating the at least one driver roller to move the EWP member.

4. A method of processing an Engineered Wood Product member to a predetermine length as in claim 3 having a first and second driver roller and a corresponding aligned first and second pressure roller.

5. A method of processing an Engineered Wood Product member to a predetermind length as in claim 4 wherein the first and second driver rollers are spaced apart and positioned on opposite sides of the measuring wheel.

6. A method of processing an Engineered Wood Product member to a predetermined length as in claim 1 wherein the measuring assembly further comprises an encoder positioned adjacent the measuring wheel for tracking rotation of the measuring wheel 7. A method of processing an Engineered Wood Product member to a predetermined length as in claim 1 wherein the measuring wheel is at least six inches in diameter.

8. A method of processing an Engineered Wood Product member to a predetermined length as in claim 3 wherein the step of feeding the EWP member into an EWP processing apparatus further comprises feeding the EWP member into the EWP processing apparatus such that the EWP member engages at least one of the driver rollers.

9. A method of processing an Engineered Wood Product member to a predetermined length as in claim 1 wherein the step of moving the EWP member to a home position further comprises the step of:

moving the EWP member from a first position wherein a front end of the EWP member does not engage a home position sensor to a so position wherein the front end of the EWP member engages the home position sensor.

10. A method of processing an Engineered Wood Product member to a predetermined length as in claim 1 further comprising the step of moving the EWP member to an outfeed table.

11. A method of processing an Engineered Wood Product member to a predetermined length as in claim 1 further comprising the step of placing the EWP member onto an infeed table.

12. An Engineered Wood Product processing apparatus comprising:

a driving unit having a driver assembly for moving an EWP member, a length determining assembly for sensing the location of an EWP member, and a measuring assembly for measuring the distance of movement of an EWP member, the measuring assembly including a measuring wheel having a hard smooth facing for contact with the EWP member;

a cutting unit for cutting an EWP member into preselected lengths.

13. An Engineered Wood Product processing apparatus as in claim 12 wherein the length determining assembly further includes one or more position sensor devices, at least one of said position sensor devices positioned adjacent an EWP member in a home position.

14. An Engineered Wood Product processing apparatus as in claim 12 the driver assembly having at least one driver roller, the driving unit having a pressure assembly having at least one pressure roller, each driver roller aligned with a corresponding pressure roller.

15. An Engineer Wood Product processing apparatus as in claim 14 having a first and second driver roller and a corresponding aligned first and second pressure roller.

16. An Engineered Wood Product processing apparatus as in claim 15 wherein the first and second driver rollers are spaced apart and positioned on opposing sides of the measuring wheel.

17. An Engineered Wood Product processing apparatus as in claim 12 wherein the measuring assembly further includes an encoder positioned adjacent the measuring wheel for tracking rotation of the measuring wheel.

18. An Engineered Wood Product processing apparatus as in claim 12 wherein the measuring wheel is at least six inches in diameter.

19. An Engineered Wood Product processing apparatus as in claim 12 further comprising an infeed table and an outfeed table, said tables having a plurality of table rollers, said table rollers positioned at an angle with respect to a floor surface.

20. An Engineered Wood Product processing apparatus as in claim 12 the length determining assembly having a home position sensor.

21. An Engineered Wood Product processing apparatus as in claim 17, the measuring assembly having a pivoting arm supporting the measuring wheel and a measuring wheel pressure cylinder operably connected to said pivoting arm to maintain pressure between the measuring wheel and an EWP member adjacent the measuring wheel.

22. A method of processing as Engineered Wood Product member to a predetermined length comprising the steps of:

feeding the EWP member into an EWP processing apparatus;

measuring the length of the EWP member;

optimizing the cuts to be made to the EWP member;

moving the EWP member to a plurality of cutting positions and cutting the EWP member into a plurality of pieces.

23. A method as in claim 22 wherein the steps of moving the EWP member to a plurality of cutting positions and cutting the EWP member into a plurality of pieces includes the step of moving the EWP member to a first cutting position and cutting a waste portion of the EWP member.

24. A method as in claim 22 wherein the step of measuring includes moving the EWP member to a home position and then moving the EWP member from the home position while engaging the EWP member with a measuring assembly.

25. A method as in claim 23 wherein the measuring assembly includes a measuring wheel having a smooth head facing, the facing contacting the EWP member.

26. A method as in claim 23 wherein the step further comprises the steps of:

activating one or more position sensor devices, at least one of said position sensor devices positioned such that the EWP member engages the at least one position sensor device while in the home position, and moving the EWP member from the home position until the at least one said position sensor device is disengaged by the EWP member.

27. A method as in claim 22 wherein moving the EWP member further comprises the steps of:

clamping the EWP member between at least one driver roller and at least one pressure roller, each driver roller aligned with a corresponding pressure roller, and rotating the at least one driver roller to move the EWP member.

28. A method as in claim 26 having a first and second driver roller and a corresponding aligned first and second pressure roller.

29. A method as in claim 24 wherein the measuring wheel is at least six inches in diameter.

* * * * *